T. R. SINCLAIRE.
FILTER.

No. 171,635.  Patented Dec. 28, 1875.

UNITED STATES PATENT OFFICE.

THOMAS R. SINCLAIRE, OF NEW YORK, N. Y., ASSIGNOR TO SINCLAIRE RECTIFYING MACHINE COMPANY, OF SAME PLACE.

IMPROVEMENT IN FILTERS.

Specification forming part of Letters Patent No. 171,635, dated December 28, 1875; application filed April 20, 1874.

*To all whom it may concern:*

Be it known that I, THOMAS R. SINCLAIRE, of the city, county, and State of New York, have invented certain Improvements in Apparatus for Filtering Liquids, of which the following is a specification:

This invention relates to certain improvements in filtering chambers or vessels, whereby the liquid to be filtered is caused to percolate the body or mass of the filtering material, and thereby become properly filtered before reaching the place of discharge, as will be hereinafter more fully described.

Figure 1:
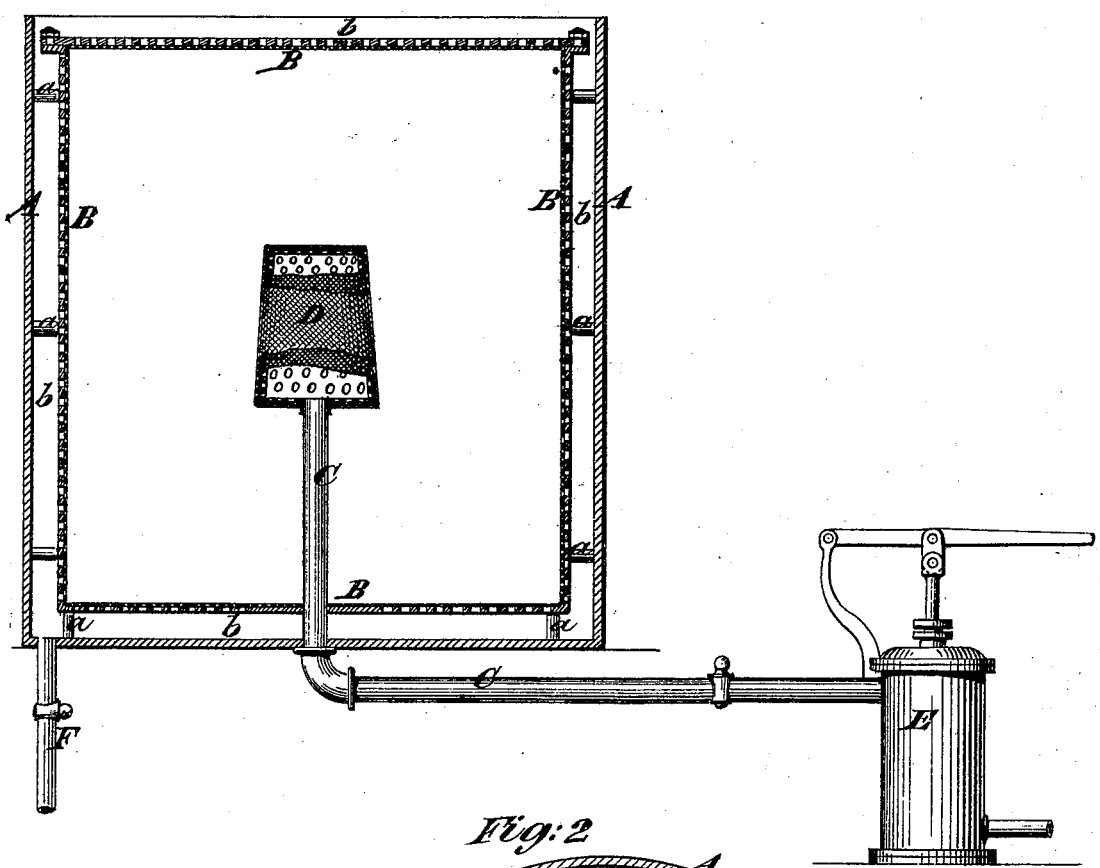
Figure 2:
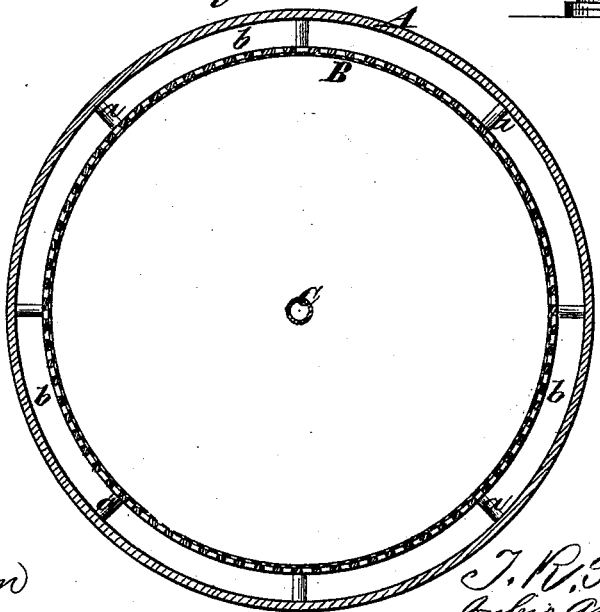

In the drawing, Figure 1 is the sectional elevation of my improved apparatus, and Fig. 2 is a horizontal section of the same. Similar letters of reference indicate corresponding parts in both figures.

B is the filtering-chamber for containing the charcoal or other filtering material, and which may be of cylindrical, conical, or other suitable form. The top or cover of this chamber is represented removable for the introduction and removal of the filtering material. The sides, top, and bottom of said chamber are all represented as perforated or reticulated. They may be made of perforated metal, or of wirework, or of perforated metal lined or covered on either side with wire-gauze, and with a lining or covering of fibrous material, or may be made of any other suitable pervious material. C is a pipe for introducing the liquid to be filtered. This pipe is represented as passing through the bottom of the chamber B, but it might pass through the top or sides. It is shown as terminating near the center of the said chamber in a distributer, D, which may be of conical, cylindrical, conoidal, spherical, spheroidal, or other suitable form. This distributer is represented as made of perforated sheet metal with a covering of wire-gauze and an outer covering of fibrous material, but the pipe itself may be constructed or organized to form a distributer, or the distributer may be made wholly or partially perforated or permeable, and may be arranged wholly or partially within the said chamber B, and have the pipe C connected with it outside of the said chamber. The chamber B, constructed and having the pipe C and distributer D arranged as represented, would be filled with the charcoal or other filtering material, all around, above, and below the distributer D, which occupies the center of the body or mass of filtering material, but it may not be necessary in all cases to pack the material entirely around the distributer or pipe C. A force-pump, E, is shown connected with the pipe C, for the purpose of forcing the liquid to be filtered through the said pipe into the chamber B. A is an outer vessel surrounding the chamber B, for the collection of the filtered liquid issuing from the said chamber. This vessel may be of a form corresponding with that of the chamber B, but it is larger, that there may be a space, $b$, between the two. The chamber B is shown as supported and kept in place within the said vessel A by studs $a\ a$ between them, which vessel A may be provided with a loose cover for the exclusion of dust, or for any other desirable purpose.

In the operation of filtering by the apparatus represented, the liquid to be filtered is forced by the force-pump E through the pipe C and distributer D, into the center or interior of the body or mass of charcoal or other filtering material in the filtering-chamber B, whence it percolates through the said material in all directions from the center toward the outside thereof, passing out through the bottom and sides of the said chamber and overflowing through the top thereof into the vessel A, from which it passes or is drawn off through the pipe F, at the bottom of the latter.

Instead of the force-pump some other means of producing pressure might be used in this apparatus, or an elevated reservoir or feeder substituted for such means, in connection with the pipe C, to produce a natural flow of the liquid by gravitation or static pressure through the pipe C, and outward from the center or interior through the filtering material toward the outside thereof.

While I prefer in all cases to employ the outer vessel A, this may be dispensed with, and pans or troughs or other suitable receptacles may be provided and arranged to receive the filtered liquid, as the latter percolates outward through and from the filtering-chamber.

Although in the operation described, the liquid to be filtered is represented as being caused to pass through the receiver D, outwardly through the filtering material toward and through the walls of the chamber or vessel B, yet it is obvious that the said liquid may be fed from the exterior of the said chamber or vessel, and caused to pass inwardly toward the said distributer, and escape therefrom into any suitable receptacle.

I am aware that filtering-vessels have been constructed with top and bottom walls only perforated, but I have found that in filters of such construction the liquid will channel around the filtering material next to the unperforated or impervious walls, and I have found also that by making the side walls one or all perforated, pervious, or porous, I obviate this difficulty, and herein, and in connection with other parts of my apparatus herein described, consist my improvements.

What I claim, and desire to secure by Letters Patent, is—

1. A filtering chamber or vessel having one or more wholly or partially perforated or permeable side or lateral wall or walls, with wholly or partially perforated or permeable top and bottom walls, either or both, substantially as described.

2. The combination of a filtering-chamber or vessel having one or more wholly or partially perforated or permeable side or lateral wall or walls, with wholly or partially perforated or permeable top and bottom walls, either or both, and a distributer, all with or without an outer vessel, and with or without a forcing apparatus, substantially as described.

3. The combination of a filtering-chamber or vessel for containing charcoal or other filtering material, having wholly or partially perforated or permeable side or lateral wall or walls, provided with a permeable lining or covering, with or without wholly or partially perforated permeable top and bottom walls, either or both, the same being with or without a lining or covering, substantially as described.

4. The combination of an inner filtering-chamber, an outer vessel, and the side or lateral studs or projections, with or without the bottom or end studs or projections, substantially as described.

5. The vessel A, the wholly or partially perforated or permeable side, top, and bottom walls, the distributer D, the pipe C, the outlet F, space $b$, and a force-pump, E, all combined and arranged substantially as described.

THOS. R. SINCLAIRE.

Witnesses:
 HENRY T. BROWN,
 M. RYAN.